E. G. ADAMS.

VEHICLE PROPELLER.

No. 10,256. Reissued Dec. 5, 1882.

Witnesses.

Jas. E. Hutchinson.

Henry C. Hazard.

Inventor.

E. G. Adams, by

Geo. S. Grindle, his Atty.

N. PETERS, Photo-Lithographer, Washington, D. C.

UNITED STATES PATENT OFFICE.

EDWIN G. ADAMS, OF COHOES, NEW YORK.

VEHICLE-PROPELLER.

SPECIFICATION forming part of Reissued Letters Patent No. 10,256, dated December 5, 1882.

Original No. 195,553, dated September 25, 1877. Application for reissue filed September 18, 1882.

*To all whom it may concern:*

Be it known that I, EDWIN G. ADAMS, of Cohoes, in the county of Albany and State of New York, did invent certain new and useful Improvements in Vehicle-Propellers, for which Letters Patent No. 195,553 were issued to me upon the 25th day of September, 1877, which Letters Patent having been found defective, in that the specification and claims do not cover and embrace all of the original invention as set forth in the application filed in the Patent Office on the 24th day of March, 1877; now, therefore, being desirous of reissuing said Letters Patent herewith surrendered, I have prepared, and do hereby declare that the following is, a full, clear, and exact description of the said invention, reference being had to the accompanying drawings, making a part of this specification, in which—

Figure 1:
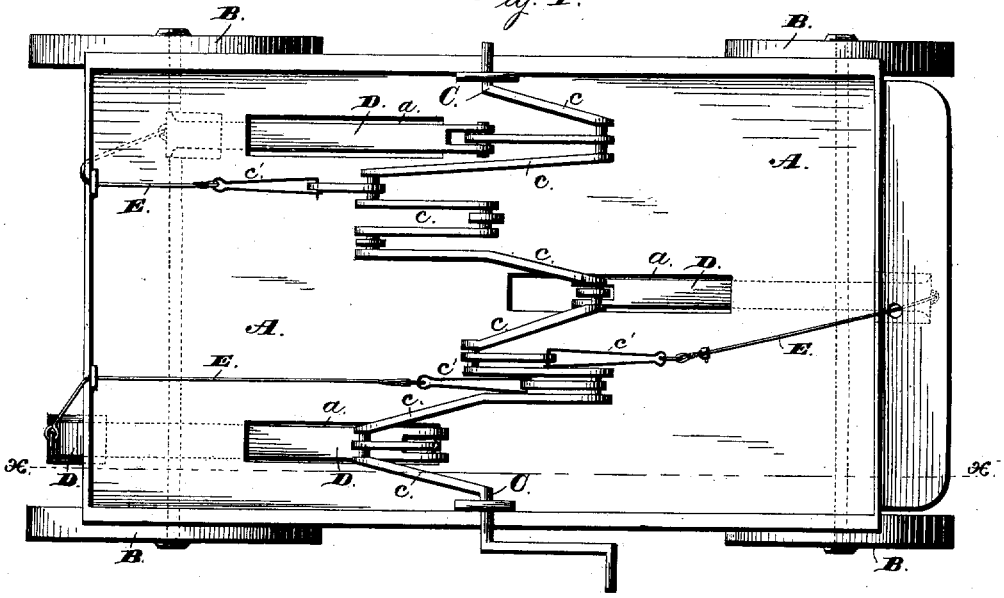
Figure 2:
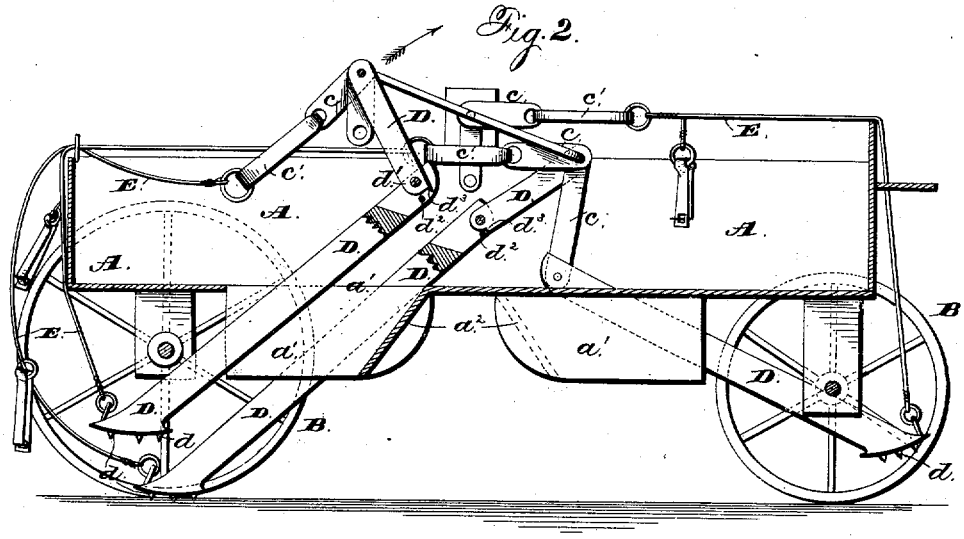

Figure 1 is a plan view of a vehicle provided with my improved propelling mechanism; and Fig. 2 is a longitudinal section of the same upon line *x x* of Fig. 1.

Letters of like name and kind refer to like parts in each of the figures.

The design of my invention is to enable wagons, street-cars, canal-boats, and other like land and water vehicles to be easily and effectively propelled; and to this end it consists, principally, in a wheeled vehicle, in the combination of a driving-axle having a number of cranks with propelling-levers which are journaled at their upper ends upon and are directly driven by said cranks, are provided each with a central joint, and are adapted to have their lower ends impinge upon and engage with the surface of the ground at each revolution of said axle, substantially as and for the purpose hereinafter specified.

It consists, further, in combining with the axle-cranks of a vehicle-propeller propelling-levers which are journaled thereon at one end and adapted to have their lower ends engage with the ground at each revolution of said axle, and are each provided with a locking-joint, substantially as and for the purpose hereinafter shown.

It consists, further, in combining with the axle-cranks of a vehicle-propeller, and with jointed propelling-levers journaled thereon and adapted to impinge upon and engage with the ground at each revolution of said axle, a cord connected with and extending between the lower end of each lever and one of the cranks of said driving-axle, and adapted to raise said lever from contact with the ground as the same is moved forward, substantially as and for the purpose hereinafter set forth.

It consists, finally, in the construction of the joint of the propelling-lever, substantially as and for the purpose hereinafter specified.

In the annexed drawings, A represents the body or box of my vehicle, supported by or upon four ground-wheels, B and B, which are journaled near the front and rear ends of said box. Journaled within suitable bearings at or near the longitudinal center at the upper side of the box A is a shaft or axle, C, which between its ends is provided with a number of cranks, *c*, that are preferably set at relatively different angles. Upon each crank *c* is pivoted or journaled one end of a lever, D, that from thence extends rearward and downward, and at its opposite lower end is provided with a shoe or with spikes *d*, to enable it to engage with the surface of the ground. At a point about one-third the distance from the upper end to the lower end each lever is provided with a joint, *d'*, which enables the same to be flexed in a vertical plane; but as it is intended that such jointed part shall have only a downward bend, a pin, $d^2$, is secured within and projects laterally from the sides of the lower part of said lever, and engages with a shoulder, $d^3$, that is formed upon the end of the upper part of the same, the result of which construction is the arresting of the movement of said joint whenever the parts have assumed the position shown in the engaging lever in Fig. 2, and are substantially in a line with each other. Each lever D passes downward through an opening, *a*, in the bottom of the bed or box A, and around such opening, upon the lower side of said bed, is a kerb, *a'*, which operates to insure the position of said lever. At the rear end of each kerb is provided a plate, $a^2$, which acts as a guide and fulcrum and prevents said lever from flexing when in engagement with the ground. For each crank *c*, to which is pivoted a lever, D, a second crank, *c'*, is provided, and is set at an opposite angle from the former. To each of said cranks *c'* is connected one end of a cord, E, which cord from thence passes over a guide-pulley at the end of the bed A, and thence downward to the lever D, to which it is connected near its lower end.

The operation of the device thus constructed is as follows, viz: Upon rotating the shaft C each lever D will be alternately moved rearward and downward and caused to impinge upon the surface of the ground, so as to push the vehicle forward until its crank has passed above a line extending from said shaft to the lower end of said lever, when the latter will commence an upward and a forward movement, and at the same instant its cord E will be drawn upward by its crank and will carry in the same direction the lower end of said lever. During the retracting and lifting operation the joint $d'$ of the lever D permits the latter to flex, as shown in Fig. 2, and thus avoids the necessity which would otherwise exist for a longitudinal movement equal to the throw of its crank. When the crank $c$ has passed its front center and commences to move downward and rearward, the cord E releases the foot of the lever D and permits the same to engage again with the ground, after which the operation before described is repeated and the vehicle moved forward. In consequence of the relative arrangement of the cranks $c$ the feet of the levers D alternately come into contact with the ground and impart to the vehicle a continuous forward motion. The feet of said levers are rounded in a line with the draft, so as to roll upon the surface of the ground as the upper ends of said levers follow the cranks, by which means perfect engagement is secured during the entire period of contact.

For use in moving the vehicle backward when desired, one or more levers, D, are extended forward, and are operated by reversing the motion of the crank-shaft. When not in use said levers may be prevented from engaging with the ground by drawing upward upon the cords E and securing the latter to some stationary part of the vehicle.

Having thus fully set forth the nature and merits of my invention, what I claim as new is—

1. In a wheeled vehicle, the combination of a driving-axle having a number of cranks with propelling-levers which are journaled at their upper ends upon and are directly driven by said cranks, are provided each with a central joint, and are adapted to have their lower ends impinge upon and engage with the surface of the ground at each revolution of said axle, substantially as and for the purpose specified.

2. In combination with the axle-cranks of a wheeled vehicle, propelling-levers which are journaled thereon at one end and adapted to have their lower ends engage with the ground at each revolution of said axle, and are each provided with a locking-joint, substantially as and for the purpose shown.

3. In combination with the axle-cranks of a vehicle-propeller, and with jointed propelling-levers journaled thereon and adapted to impinge upon and engage with the ground at each revolution of said axle, a cord connected with and extending between the lower end of each lever and one of the cranks of said driving-axle, and adapted to raise said lever from contact with the ground as the same is moved forward, substantially as and for the purpose set forth.

4. The propelling-lever D, provided with the joint $d'$, stop-pin $d^2$, and engaging-shoulder $d^3$, substantially as and for the purpose specified.

In testimony that I claim the foregoing I have hereunto set my hand this 27th day of June, 1882.

EDWIN G. ADAMS.

Witnesses:
AUSTIN F. PARK,
JOHN J. RAFFERTY.